United States Patent
Jacquot et al.

(10) Patent No.: US 7,640,503 B1
(45) Date of Patent: Dec. 29, 2009

(54) GRAPHIC REPRESENTATION OF COMPUTER RECONFIGURATIONS

(75) Inventors: Bryan J. Jacquot, Ft. Collins, CO (US); Edgar Circenis, Ft. Collins, CO (US); Kurt M. Olender, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 152 days.

(21) Appl. No.: 11/590,162

(22) Filed: Oct. 31, 2006

(51) Int. Cl.
*G06F 15/177* (2006.01)
*G06F 15/173* (2006.01)

(52) U.S. Cl. .............. 715/735; 715/736; 715/741; 715/743; 709/220; 709/223; 709/224

(58) Field of Classification Search ......... 715/734–744, 715/708, 713, 714; 709/220–237
See application file for complete search history.

(56) References Cited

U.S. PATENT DOCUMENTS

| | | | |
|---|---|---|---|
| 5,828,376 A * | 10/1998 | Solimene et al. | 715/821 |
| 6,490,620 B1 * | 12/2002 | Ditmer et al. | 709/224 |
| 6,650,347 B1 * | 11/2003 | Nulu et al. | 715/853 |
| 6,704,873 B1 | 3/2004 | Underwood | |
| 6,983,317 B1 | 1/2006 | Bishop et al. | |
| 7,055,136 B2 * | 5/2006 | Dzoba et al. | 717/125 |
| 7,100,195 B1 | 8/2006 | Underwood | |
| 7,130,831 B2 * | 10/2006 | Howard et al. | 705/57 |
| 7,426,592 B2 * | 9/2008 | Chen | 710/104 |
| 2002/0109718 A1 * | 8/2002 | Mansour et al. | 345/744 |
| 2002/0129096 A1 * | 9/2002 | Mansour et al. | 709/203 |
| 2002/0147972 A1 * | 10/2002 | Olmeda et al. | 717/174 |
| 2003/0009537 A1 * | 1/2003 | Wang | 709/219 |
| 2004/0078373 A1 * | 4/2004 | Ghoneimy et al. | 707/10 |
| 2005/0108406 A1 * | 5/2005 | Lee et al. | 709/228 |
| 2006/0055741 A1 * | 3/2006 | Watanabe et al. | 347/68 |
| 2006/0282498 A1 * | 12/2006 | Muro | 709/203 |
| 2007/0226241 A1 * | 9/2007 | Ng et al. | 707/102 |
| 2008/0189405 A1 * | 8/2008 | Zarenin et al. | 709/224 |

* cited by examiner

*Primary Examiner*—Tadeese Hailu

(57) ABSTRACT

The present invention provides a computer management method. This method involves responding to a "get web page" request by generating a web page with graphic representation of computer system objects and embedded script-based context-sensitive menu control. Once the web page is displayed, the method provides for responding to selection of one of said graphic representations by activating and inactivating menu items in accordance with properties of said objects embedded in said web page with said objects under control of said script-based context-sensitive menu control.

4 Claims, 2 Drawing Sheets

GRAPHIC REPRESENTATION OF COMPUTER RECONFIGURATIONS

BACKGROUND OF THE INVENTION

Herein, related art may be discussed to put the invention in context. Related art labeled "prior art" is admitted prior art; related art not labeled "prior art" is not admitted prior art.

Enterprise and other large computer systems and networks can be centrally managed via management software that can present a graphic representation of a computer system to a human administrator and that can respond to reconfigurations of that graphic representation by implementing analogous reconfigurations on the actual system or network. Such management software faces a challenge of informing a user which actions (e.g., start, stop, rename, delete, create, etc.) may be performed on which objects (e.g., networks, network switches, network nodes, servers, partitions, virtual partitions and machines, shared resource domains, clusters, etc.).

Typically, available actions are presented in a menu of actions; the menu can be drop-down, pop-up, or permanently visible. Each time an object is selected, a menu of actions available for that object can be generated and presented to the user, e.g., in response to a "get" request by the user's web browser-based interface. However, the latencies involved each time a selection is changed can detract from the user experience; moreover, generating and communicating web pages every time a selection is changed can impose utilization and bandwidth burdens. An alternative approach is to provide a full list of actions that remains the same across objects, and send an error message if the user selects an action that does not apply to the selected object. However, the error messages can detract from the user experience. What is needed is an improved approach to presenting available actions to an administrator/user for centrally managed computer systems and networks.

BRIEF DESCRIPTION OF THE DRAWINGS

The following drawings are of embodiments of the invention and not the invention itself.

DETAILED DESCRIPTION

The present invention generates a web page with embedded JavaScript indicating to management software which actions are available for each object. When the graphical representation of a system or network is first requested, the JavaScript is generated to reflect the current association of objects and actions, which can change according to the state of the objects and associated licensing rights. Once the graphical representation is transmitted to the user, the menu items change when object selection changes as dictated by the JavaScript without new pages having to be generated from the management server. This provides the administrator/user with a responsive interface without the latency and bandwidth burdens involved in generating and communicating web pages each time a different object is selected. Unavailable actions are clearly indicated as such. Clicking on an unavailable item can yield an explanation of why it is unavailable. Different embodiments of the invention present different combinations of the features.

Figure 1:
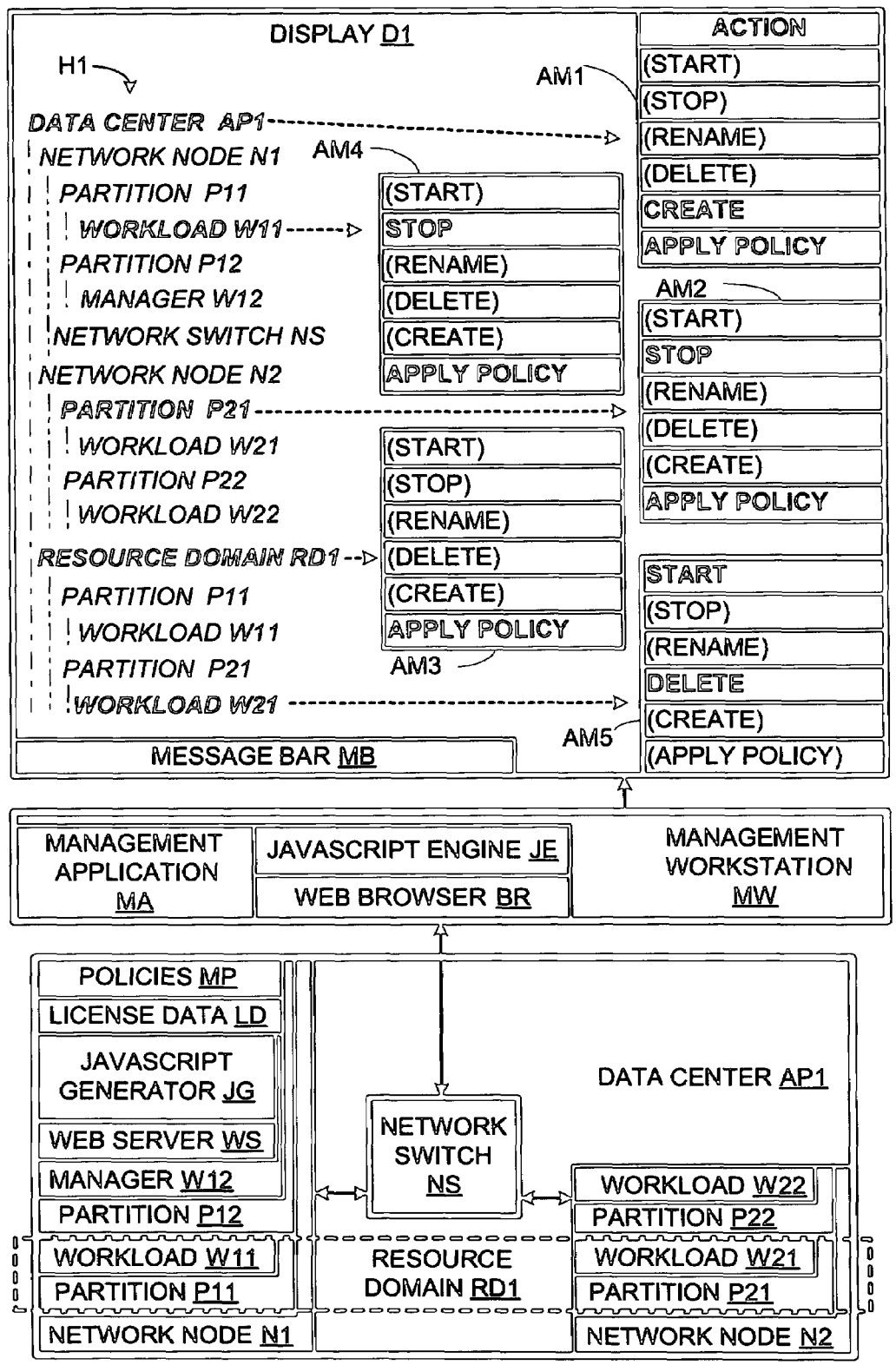
FIG. 1 is a schematic illustration of a centrally managed computer network in accordance with an embodiment of the invention. In the figure, graphic representations of actual objects are in italics. Available actions are indicated in bold; unavailable action items are in normal type in parentheses. An arrowhead ">" indicates clicking on the menu item will cause a submenu or additional information to be presented.

As shown in FIG. 1, a data center AP1 has two network nodes N1 and N2 and a network switch NS. (Reminder: some reference alphanumerics appear more than once in FIG. 1, once to represent the referent itself, and once or twice in italics to represent graphic representations of the referent.) Management workstation MW couples to data center AP1 via network switch NS. Node N1 is divided into two partitions, P11 and P12, each having a respective workload W11 and W12. Likewise, node N2 is divided into two partitions, P21 and P22, each having a respective workload W21 and W22. Note that the data center or other system being centrally managed can have any positive number of network nodes, and each node can be undivided or partitioned. Also, the partitions can be hard or virtual or both. Partitions can be grouped, e.g., into high-available clusters or shared resource domains. For example, partitions P11 and P21 are grouped into a shared resource domain RD1.

The workloads can be operating systems, applications, virtual machines, and combinations of these. Manager W12 in particular, is a manager application that can apply actions to data center objects such as nodes, switches, partitions, and workloads. Manager workload W12 accesses management polices MP and license data LD, also stored on partition P12, in determining what actions can be applied to which objects. Workloads can be active or inactive; in FIG. 1, workload W21 is inactive, while the other workloads shown are active. Note that, as the terms are used herein, "computer programs", "computer software", and "computer instructions" are tangibly embodied in computer-readable media, and are not merely abstract ideas but rather effect changes in state in computer-readable memory.

Management workstation MW, which can be external to data center AP1 or can be included in data center AP1, is a computer that runs a management application MA that serves as a control interface between an administrator and manager workload W12. Associated with management application MA is a web browser BR with a JavaScript engine plugin JE. Web browser BR provides a familiar interface to the administrator to manager workload W12, which includes a web server WS and a JavaScript generator JG.

Management application MA generates a graphical representation of data center AP1 on a display D1. The graphical representation is presented schematically in FIG. 1. In FIG. 1, graphic representations of actual data center objects are indicated in italics. Thus "DATA CENTER AP1" is a graphic representation of data center AP1. The graphic elements are presented in hierarchical arrangements. As resource domains and network nodes are not in hierarchical relation to each other, they are presented as separate hierarchies and their common elements (partitions P11 and P21 and workloads W11 and W21) are shown twice on display D1.

Also shown within display D1 are five instances AM1-AM5 of an "action menu". The menu can be a drop down menu. Alternatively, it can be a popup menu or a permanently displayed menu. The title of the menu is shown on a menu bar at the top of the display, and the menu appears when a user activates the menu title item. The menu appears at the same place every time; in FIG. 1 it is shown in five different places so that all instances could be viewed at once. The different menu instances appear in response to different user selections from a hierarchy H1 at the left of display D1. The five bolded hierarchy items ("data center AP1", "workload W11", "partition P21", "workload W21", and resource domain RD1 correspond respectively to menu instances AM1-AM5. More generally, any item in the hierarchy can be selected and a corresponding instance of the action menu will appear.

Each hierarchy item is a JavaScript object; the actions supported by an object are determined when the web page is generated and encoded as object properties. When a user selects an object, JavaScript identifies the actions supported and generates a corresponding menu instance. Thus, selecting a different item in the hierarchy does not generate a new http request and no new web page is generated. This makes the context sensitive action menu more responsive from the user's point of view, and the interactivity does not repeatedly compete for network bandwidth.

Each instance of the action menu shows the same six items. Active items are relatively highlighted, e.g., bright versus dimmed. Highlighted items are shown in bold in FIG. 1, while dimmed items are shown in parentheses. Selecting an active item triggers the selected action. Selecting an inactive item yields an explanation for its inactive status.

Menu items can be inactive for several reasons. The first is that an action does not apply to an object. For example, it does not make sense to stop the entire data center when "data center" is selected. Thus, when a "data center AP1" is selected, "stop" will be dimmed. If "stop" is selected (clicked on) in this context, a message "this application does not support shutting down the entire data center" will appear in message bar MB below the menus or at the bottom of the display. Alternatively, it can appear as a dialog box, which includes a "close" button that when activated closes the dialog box. or in a balloon that appears near a cursor as it hovers over the dimmed item.

A menu item can be inactive even if applicable to a hierarchy item because the action is not available in the present context. For example, "start" is dimmed for hierarchy items that are currently running, while "stop" is dimmed for hierarchy items that are currently stopped. A menu item can be inactive even if the corresponding action is applicable to that item simply because management application MA does not support that action. For example, management application MA does not support renaming data center AP1 or workloads.

Finally, menu items can be dimmed because an action is prohibited by license terms. For example, it may not be possible to start a stopped partition because a hardware right-to-use provision might be violated. For another example, it might not be possible to start a workload because it is not licensed for the additional instance involved or because it cannot be activated because the partition on which it is installed has more hardware resources than are permitted by the workload license.

Whatever the reason for a menu item being inactive, clicking on that item causes an explanation to be displayed. This allows the user to respond intelligently to inactivated items. For example, the user can initiate a change in license terms to activate menu items that are inactive due to license restrictions. This is convenient for the user and profitable for the licensor. In the illustrated embodiment, a new web page will be generated in response to a new web page request so that any changes due to a change in license terms will be reflected in JavaScript. Some examples are explored below.

"Data center AP1" is selected implicitly when the illustrated page is first displayed. It can also be selected by clicking on it. When a hierarchy item is selected, it is highlighted, e.g., bolded. In either case, menu instance AM1 appears. Management application MA runs within datacenter AP1, so it cannot support starting data center AP1; therefore, "start" is dimmed. Activating "start" yields a message ("data center is currently running"). As discussed above, management application MA does not support stopping data center AP1, so the corresponding item is inactive. Management application MA does not support renaming or deleting the data center, so these items are dimmed. Clicking on these dimmed items yields a message such as "management application does not support deletion of the top level data center". Active item "create" can be clicked to yield a dialog box that allows a new shared resource domain to be created and named. Active item "apply policy" can be clicked to yield a proposed reallocation of workloads to hardware resources; the proposed reallocation can be confirmed and implemented, edited confirmed and implemented, or cancelled without being implemented.

"Partition P21" can be selected from the graphic hierarchy to yield menu instance AM2. "Partition P21" appears twice in the hierarchy, once under "network node N2" and once under "resource domain RD1". Clicking on either instance, highlights both instances and the effect on the "action" menu is the same. Clicking on "action" to display the action menu and then selecting inactive "start" yields a message that the partition is cannot be started because it is already running. Clicking on "stop" safely terminates workload W21 and powers down partition P21. Clicking on inactive items "rename", "delete", and "create" (e.g., a new workload), results in messages requiring workload W21 to be stopped or deleted as a condition for activating these items. Clicking on "apply policy" yields a selection of applicable policies.

"Resource domain RD1" can be selected by clicking on the hierarchy item to yield menu instance AM3. Selecting a dimmed item yields a message indicating why it is not active. Selecting active item "apply policy" generates a suggested reallocation of resources within resource domain RD1 in accordance with policies MP and license data LD. A dialog box offers options of implementing the reallocation, editing the reallocation and then implementing it, or canceling the proposed reallocation.

Figure 2:
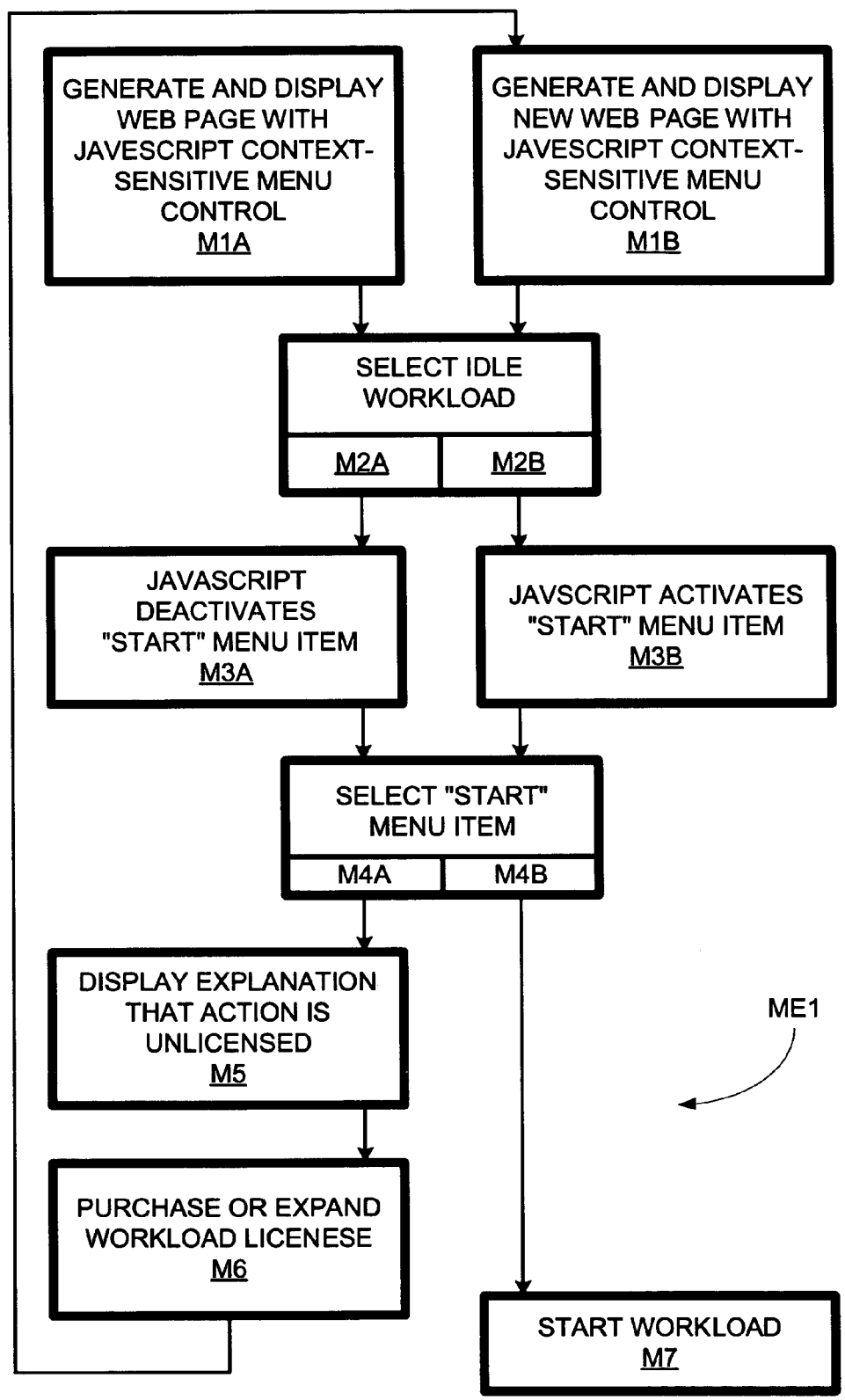
FIG. 2 is a flow chart of a method in accordance with an embodiment of the invention.

"Workload W11" can be selected by clicking on the item in hierarchy H1. Since "workload W11" appears twice in hierarchy H1, clicking on either will highlight both instances and yield action menu instance AM4. Management application MA only supports stopping workloads that are running, so other items are dimmed. Management application MA does not support renaming, deleting, or creating workloads. These are done outside management application MA. However, management application MA does support applying a policy to a workload licensed for such an action. Workload W11 is so licensed so the "apply policy" item is active when workload W11 is selected. Workload W21, otherwise similar as far as menu items are concerned, is not currently licensed for applying policies, so that item is inactive for workload W21, as indicated in menu instance AM5. The dependence of menu items on license terms is explained further below with reference to the flow chart for method ME1 in FIG. 2

The present invention provides for many alternative methods both in and out of the context of data center AP1. Centralized computer management method ME1 is flow charted in FIG. 2. At method segment M1A a web page is generated and displayed to a user. The page has Javascript context-sensitive menu control embedded therein. In particular, the contents of an "action" menu change depending on which item is selected.

When a user selects an idle workload, at method segment M2A/M2B, the start" menu item would normally be active, as indicated method segment M3B. However, "start" would be inactivated, at method segment M3A, if starting the workload would violate a license provision. The active or inactive status of a menu item is generally only apparent when a menu is displayed; thus a pull-down menu or a pop-up menu would have to be activated for the status of a menu item to be apparent.

There are several instances in which licensing terms can cause a menu item to be inactive. For one, the licensed number of instances for an application might already be running; activating this additional instance might exceed the licensed number of instances. For another, the workload, or part of it, might be licensed to run in a partition with eight CPUs, whereas the partition in which the selected workload resides might have sixteen CPUs available. In these cases, the "start" item would be inactive, e.g., it would be dimmed when displayed.

If the inactive "start" menu item is selected at method segment M4A, the embedded Javascript causes an explanation to be displayed at method segment M5. This selection can be a traditional menu selection action (e.g., clicking) or an alternative such as hovering (e.g., positioning a mouse-controlled cursor) over the dimmned menu item. The displaying can involve flyover text or text in an application status bar indicating why the item is dimmed. The explanation can suggest to a user that license rights needed to be expanded before this workload could be started. In this case, the user purchases or expands the workload license as suggested at method segment M6.

The new license situation was not taken into account when the web page was generated at method segment M1A. Accordingly, the user would have to "refresh" or otherwise request a new web page at method segment M1B. Graphically, the web page would appear similar to the one generated at method segment MIA. However, the object properties would chance to reflect the new license terms. In particular, the workload selected in method segment M2A would now be licensed for starting. Thus, when that workload is selected at method segment M2B, the JavaScript displays the active menu with an active start menu item at method segment M3B. If the user selects the active start menu item at method segment M4B, the workload starts at method segment M7.

The present invention applies generally to web services. For example, a picture hosting web-site on the Internet allows users to upload photos. This web site does not allow downloading of the original high-resolution images unless a "premium" account is purchased. The save menu for this web site employs this invention so that the user is presented with the disabled option of saving original high-resolution image but given explanatory text saying they can enable this feature if they upgrade their account. Basically this invention applies to any web page from which a user can select objects and the list of allowed actions changes dynamically, especially those actions that may be disabled because the user has not purchased a specific feature.

The invention provides for a range of variations upon and modification to the illustrated embodiments. Instead of Java-Script, another browser-interpretable scripting language can be used. The invention applies to computer systems of very different scales, to geographically distributed systems with many computers and networks, to single systems capable of running multiple workloads using a variety of technologies such as hard partitions, virtual partitions, and virtual machines. The invention can be applied to systems in which entities can be grouped in ways that do not fall within a software hierarchy—e.g., into clusters or shared resource domains. The actions that can be performed and the entities on which they can be performed can vary in many ways. These and other variations upon and modifications to the present invention are provided for by the present invention, the scope of which is defined by the following claims.

What is claimed is:

1. A computer management method comprising:
   responding to a "get web page" request by generating a web page with graphic representations of computer system objects and embedded script-based context-sensitive menu control; and
   responding to selections of said graphic representations by activating and inactivating menu items of a menu in accordance with properties of objects represented in said web page as properties of graphic objects under control of said script-based context-sensitive menu control, wherein a menu item is represented as "active" or "inactive" at least in part as a function of a license status of a selected object.

2. A computer management method as recited in claim 1 wherein said menu is displayed when one of said graphic representations is selected.

3. A computer management method as recited in claim 1 wherein said menu is displayed when a menu button is activated while the graphic representation is selected.

4. A computer management system comprising:
   an interface to a management workstation;
   a computer manager for, in response to a request from said management workstation, generating a web page having a graphical representation of a computer system including a hierarchy of computer objects, said graphical representation including a hierarchy of graphical objects corresponding to said computer objects, said web page associating with said graphic objects a list of actions that can be applied by said computer manager to said computer objects, said web page including script-based context-sensitive menus with items that can be represented as active or inactive as a function of the list of actions associated with a computer object represented by a respective graphical object, wherein said menu items are indicated as active or inactive at least in part as a function of software license terms applied to corresponding computer objects; and
   web server means for transmitting said web page to said management workstation.

\* \* \* \* \*